(12) United States Patent
Hayes et al.

(10) Patent No.: US 7,430,343 B2
(45) Date of Patent: Sep. 30, 2008

(54) SYSTEM AND METHOD FOR DISPLAYING IMAGES

(75) Inventors: Eldred Hayes, Mason, OH (US); John Wundes, Santa Cruz, CA (US)

(73) Assignee: Dee Sign Company, West Chester, OH (US)

( * ) Notice: Subject to any disclaimer, the term of this patent is extended or adjusted under 35 U.S.C. 154(b) by 508 days.

(21) Appl. No.: 10/989,944

(22) Filed: Nov. 15, 2004

(65) Prior Publication Data

US 2005/0268216 A1    Dec. 1, 2005

Related U.S. Application Data

(60) Provisional application No. 60/575,706, filed on May 28, 2004.

(51) Int. Cl.
*G06K 9/54* (2006.01)
*G06K 9/36* (2006.01)
*G06F 17/00* (2006.01)

(52) U.S. Cl. .................. 382/305; 382/284; 715/221

(58) Field of Classification Search .................. 382/284, 382/305, 160, 167, 209; 705/27; 715/505–508, 715/221–226; 345/629–630, 594
See application file for complete search history.

(56) References Cited

U.S. PATENT DOCUMENTS

| 6,344,853 | B1 | 2/2002 | Knight | 345/435 |
|---|---|---|---|---|
| 6,493,677 | B1 | 12/2002 | Von Rosen et al. | 705/27 |
| 7,062,706 | B2* | 6/2006 | Maxwell et al. | 715/507 |
| 7,095,908 | B2* | 8/2006 | Jarvis et al. | 382/305 |
| 7,152,524 | B2* | 12/2006 | Davidson | 101/35 |
| 7,164,490 | B2* | 1/2007 | Manico et al. | 358/1.18 |
| 7,177,484 | B2* | 2/2007 | Fredlund et al. | 382/284 |

* cited by examiner

*Primary Examiner*—Kanji Patel
(74) *Attorney, Agent, or Firm*—Jones Day

(57) ABSTRACT

Disclosed are systems and methods for generating customized images for display to a user. In one example, a system may comprise a web server and one or more databases. A web server may generate one or more HTML pages in response to a user request. These web pages can be used to collect image customization information from the user and to display custom image designs based on the collected information. In addition, the collected image customization information and the generated custom image designs may be stored in a database.

42 Claims, 7 Drawing Sheets

222 COMPLETE SIGN
with no photo
base price includes:

STEEL FRAME 40"

MAIN PANEL 18"x30"

INSERT SPACES AVAILABLE 6"x30"

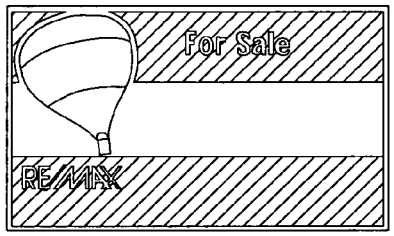

SIGN CALCULATOR
Follow these easy steps to design your signs and calculate cost ① Quantity [0]   (Note price breaks)

② Choose a Frame Color
   ○ Black
   ○ White

③ Choose a Material
   ○ 3/16 Duron hardboard (included)
   ○ .063 Aluminum
   ○ .063 Reflective Aluminum
   ○ .150 Polyethylene ④ Frame & Panel Options:
   Please choose one.
   ☐ Varnish ⑤ (Calculate!)  Current Total: $ 0.00

⑥ (Design It!)  Now you can customize your sign with personal information!

FIG.5

222 FRAME
40" high frame holds 18"x30"
panel, 6"x30" on bottom
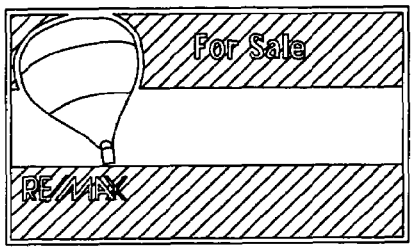
SIGN DESIGNER
Use the following steps to fill in the information to appear on your signs.
 Realtor Emblem:
none
 Agent Name:
 Optional Number:
 Please type Company Name
 Company Phone Number:
AC: ☐  Number: ☐
Design It! Now you can design your sign instantly.
Add to Cart! After you are satisfied with your sign Add to Cart!
FIG.6

222 FRAME
40" high frame holds 18"x30" panel, 6"x30" on bottom

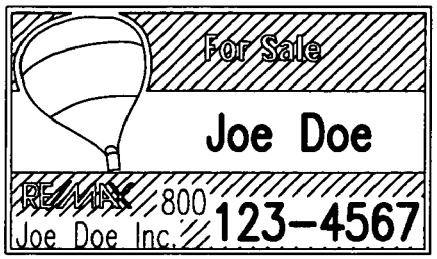

SIGN DESIGNER
Use the following steps to fill in the information to appear on your signs.

① Realtor Emblem:
   [RMLS]

② Agent Name:
   [Joe Doe]

③ Optional Number:
   [ ]

④ Please type Company Name
   [Joe Doe Inc.]

⑤ Company Phone Number:
   AC: [800]
   Number: [123-4567]

Design It! Now you can design your sign instantly.

Add to Cart! After you are satisfied with your sign Add to Cart!

FIG. 7

SYSTEM AND METHOD FOR DISPLAYING IMAGES

CROSS-REFERENCE TO RELATED APPLICATION

The present application claims priority to and the benefit of U.S. Provisional Application No. 60/575,706 filed May 28, 2004.

TECHNICAL FIELD

This document relates generally to displaying images and, more particularly, to generating customized images for display to a user.

BACKGROUND

Advertisement signs, business cards, and various promotional products and graphics having customized names, logos and other proprietary graphics embedded therein have been available for many years. The manual process of producing these customized items typically involves a specialized designer/manufacturer combining a design of a custom logo, or other custom graphic design, along with other custom information This process is often labor-intensive and can entail significant costs. Accordingly, several samples of the custom graphic design, usually bearing differently sized and variably positioned graphics thereon, are initially produced by the manufacture for a customer's review. The customer then selects one or more of the samples so that a manufacturer can conduct a larger production run from the selected sample(s).

The recent growth of e-commerce has enabled the custom-graphics designers to provide their services online, so that customers can select and order custom graphic designs of various business, commercial and promotional items from the designer's website. However, custom graphic designs are often distorted when displayed to a customer, such as by stretching or trimming it. Other disadvantages exist as well, for which improvements are needed in the display of images to users.

SUMMARY

In accordance with the teachings provided herein, methods and systems for custom image design are disclosed. In one example, a method comprises collecting a user input using one or more electronic forms; retrieving from a database one or more image templates having one or more variables associated therewith; mapping at least a portion of the user input into the one or more template variables; generating a custom image based on the image template and at least a portion of the user input, wherein the custom image is at least in part vector based; and electronically sending to the user the custom image.

In another example, a method comprises receiving from a server a first electronic form having embedded therein one or more image templates, wherein the electronic form comprises a plurality of fields that at least in part correlate to one or more variables associated with the embedded image template; providing to the server using the one or more received electronic forms a first set of image customization data; and receiving a second electronic form having embedded therein a first custom image based on an image template and the provided first set of image customization data, wherein the custom image is at least in part vector based In yet another example, a system comprises at least one database storing one or more image templates having one or more variables associated therewith; a form processing software code suitable (i) to retrieve a image template from a database, (ii) to generate an electric form having a plurality of fields, wherein fields correlate to one or more variables associated with the retrieved image template, and (iii) to collect a user input using the generated electronic form; an image processing software code suitable to generate a custom image based on the retrieved image template and the collected user input, wherein the custom image is at least in part vector based; and an image delivery software code suitable to deliver the custom image to the user.

In accordance with the teachings provided herein, systems and methods are provided for generating and displaying custom images and enabling realistic rendering of customize sign images and other advertising and business graphic designs in real time. In this example, the system and method allow its users to place not only vector-formatted custom images of logos, affiliations and trademarks on their signs but also any desired text. The system and method can also be extended to automatically format the images and the text in order to conform to franchise requirements. Such images and text can be embedded into image templates, such as Flash™ objects, Encapsulated Post Script file, Scalable Vector Graphics file, Java applet, HTML table, XML table, CFML table, Cascading Style Sheets file, and Extensible Style Language file. The resulting custom sign images may be vector-formatted files that allow the user to manipulate and view the finished custom sign proof image with high degree of accuracy and clarity.

As another example, a system and method can provide a website for creating and ordering custom signs. The custom sign generation process can be a sub-step in a shopping cart process. A user may visit the website utilizing a standard Internet browser. Once at the website, the user may select a product type such as a sign, a poster, a business brochure, etc. Then, the user may select a franchise affiliation that the selected graphic design needs to conform with. In addition, the user may upload his own custom graphics such as a photographs or other custom images.

This information may be sent to a web server, which could host a forms engine. The forms engine generates and returns to the user an HTML page having embedded therein an image template, such as a Flash object, Encapsulated Post Script file, Scalable Vector Graphics file, Java applet, HTML table, XML table, CFML table, Cascading Style Sheets file, and Extensible Style Language file. The image template may have embedded therein graphics such as logos and trademarks. These graphics may be in a vector format, such as Flash format, Encapsulated Post Script (EPS) or Scalable Vector Format (SVG).

A user may then customize an image template by entering custom image data into the provided HTML form. Once entered, the user input data is transmitted to a forms engine that stores it in a database and maps it to a plurality of template variables, which control appearance and layout of the image template. The data may then be formatted to conform to various franchise requirements. The formatting rules are provided by one or more custom code libraries that are also stored in a database and retrieved by the forms engine during the image generation process. Once the image template is populated with formatted user input data, the custom image is displayed in the users browser as, for example, a Flash movie clip or other type of vector-based image.

As yet another example, a system and method can be provided for online image customization having several databases for storing customer information, image templates, custom graphics and completed custom graphics designs. A system and method can further include a web server that may host a forms engine that can retrieve an image template from a database, to generate an HTML form, and to collect a user input using the generated form. The forms engine may also generate custom images based on the retrieved image template and user input by mapping the user input into template variables. The forms engine may also retrieve formatting rules from custom code libraries stored in a database and format user input in accordance with those rules. The web server may also host a graphics engine that may be used to vectorize the bitmap images, as well as to enable both the users and the graphic designers to format, such as by resizing or cropping, the custom images pursuant to franchise requirements.

BRIEF DESCRIPTION OF THE FIGURES

FIGS. 5-7 illustrate exemplary graphical user interfaces for use in a custom graphics generation process.

Systems and methods described herein are susceptible to various modifications and alternative forms. Thus, it should be understood, that similar to the other processing flows described herein, the steps and the order of the steps in the flowchart described herein may be altered, modified and/or augmented and still achieve the desired outcome. Furthermore, it should be understood, that drawings and the detailed description thereto are not intended as limitations to the systems and methods disclosed herein, but on the contrary they are intended to cover all modifications, equivalents, and alternatives falling within the scope of the present disclosure as defined by claims.

DETAILED DESCRIPTION

Figure 1:
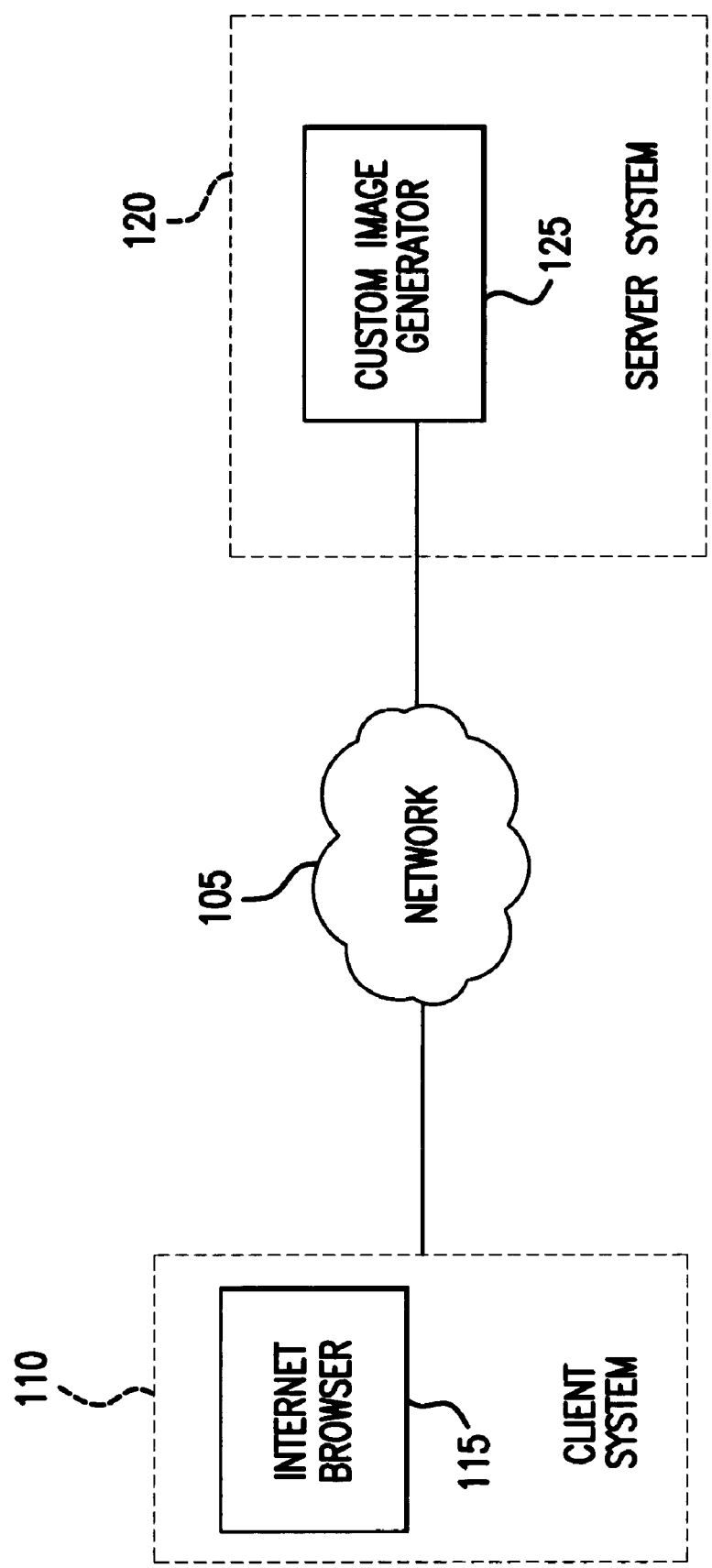
FIG. 1 is a block diagram of an exemplary custom graphics generation system.

With reference to the drawings and in particular to FIG. 1, an exemplary system is depicted which permits a customer, using his/her client system 110, and in particular a browser 115, to access a server system 120 by exchanging messages therewith over a communication network 105, such as the Internet. Although only a single client system 110 is illustrated in FIG. 1, it will be appreciated that there would typically be a plurality of client systems 110, which are connected to the communication network 105 and capable of communicating with the server system 120.

A server system 120 provides the customer with an electronic form whereby the customer input can be collected for generating a custom image, such as a customized sign. To that end, the server system 120 includes a customer image generator 125 that generates a custom image based on a predefined image template and the collected user input. The generated customer image is at least in part vector-based and is sent to the customer.

Figure 2:
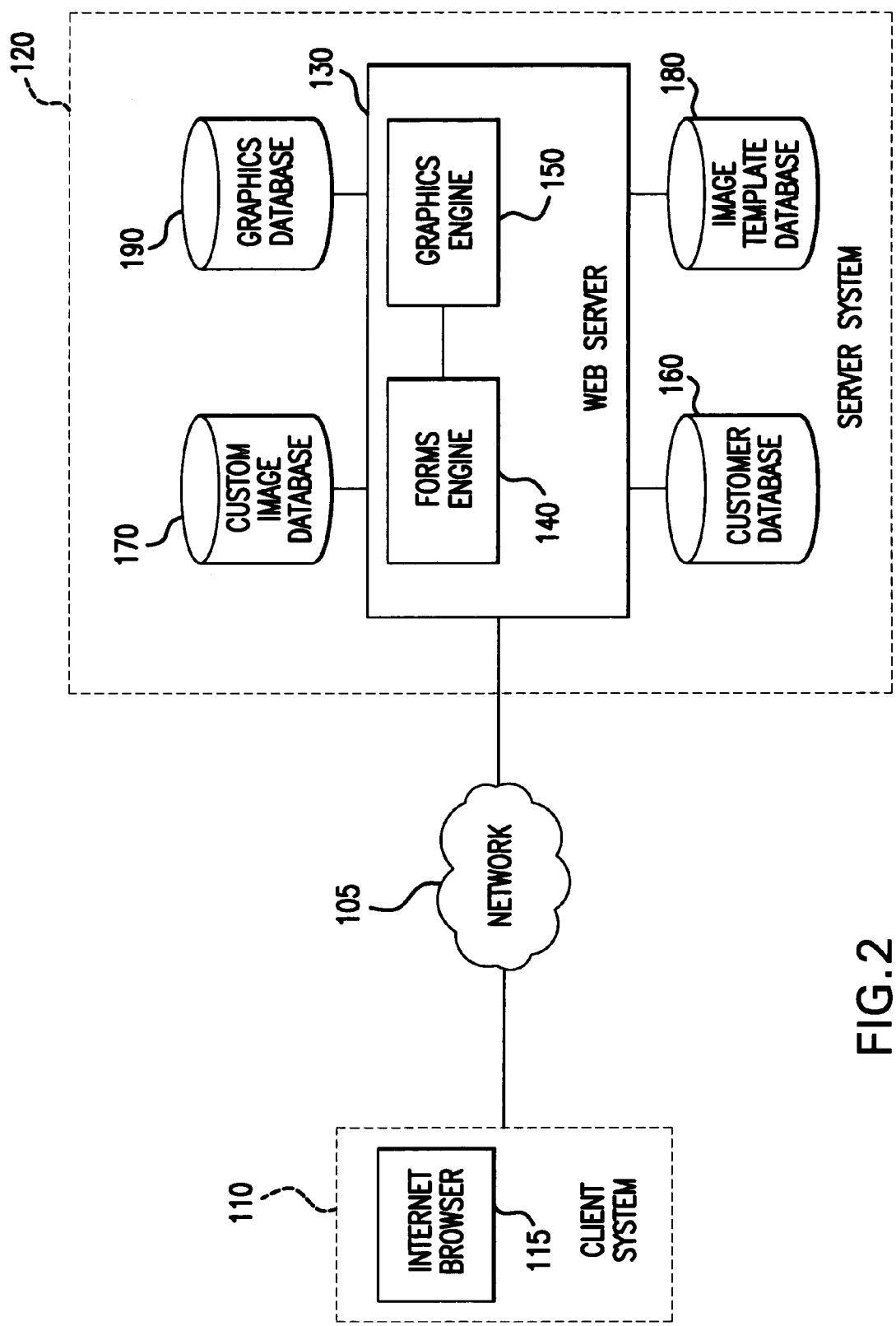
FIG. 2 is a block diagram of another exemplary custom graphics generation system.

A custom image generator 125 of server system 120 can be implemented in different ways. One example is shown in FIG. 2. The server system 120 comprises a web server 130, a forms engine 140, a graphics engine 150, a customer database 160, a custom image database 170, an image template database 180, and a graphics database 190. Various operational scenarios of the server system 120 and functionality of its individual components will be described next with reference to FIGS. 3 and 4.

Figure 3:
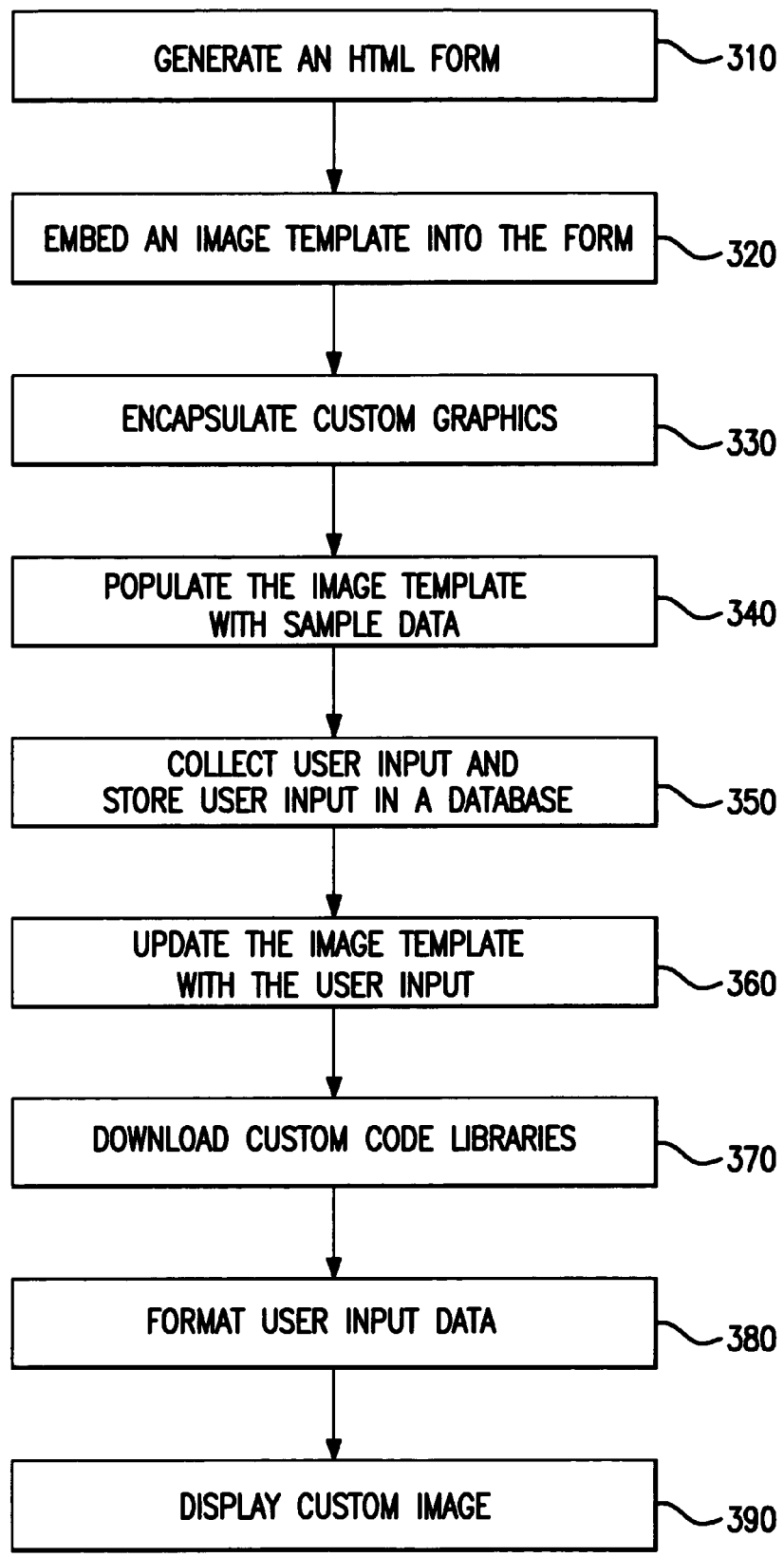
FIG. 3 is a flow diagram of an exemplary operation scenario involving a custom graphics generation system.

First, in step 310 of FIG. 3, in response to a customer request, a web server 130 generates a plurality of web pages that are sent to the browser 115 and may be used to register customers with the server system 120, to collect image customization information, to display the custom image designs, and to accept and process the customer orders. To facilitate that, the web server 130 could use many approaches, one example being hosting a forms engine 140 that generates Hypertext Markup Language (HTML) forms from data entered into the server system 120 by the system administrators.

Portions of tile HTML form may be written, for example, in ColdFusion Markup Language (CFML). CFML is a tag-based Web scripting language supporting dynamic Web page creation and database access in a Web server environment. In the language, ColdFusion tags are embedded in HTML files. The HTML tags usually determine page layout, while the CFML tags may be used to import content based on user input or the results of a database query. In particular, the CFML elements enable the Internet browser 115 to dynamically pass the user input to web server 130, and more specifically to one or more databases of the server system 120. The user input may be used to generate custom images.

In another example, the forms engine 140 may be configured to generate HTML forms containing eXtensible Markup Language (XML) code, as well as JavaScript, Common Gateway Interface (CGI) scripts and Active Server Pages (ASP) scripts. For instance, XML provides customized tags suitable for defining, transmitting, validating, and interpreting data between the client and server systems. CGI and ASP scripts may also enable browser 115 to dynamically pass user input to the server side 120 for processing. In addition, JavaScript may maybe used in the HTML page to accommodate the potential changes surrounding ActiveX components in the Microsoft Internet Explorer® browsers.

In step 320, an HTML form may contain references to one or more embedded image templates. Each image template may correspond to a particular sign image or other advertising, promotional or business graphic design. The image templates may be stored on one or more databases on the server side 120. The web server 130 retrieves an embedded image template and downloads it to the browser 115. Once downloaded, the image template may be stored in the cache of the client system 110. The image template may then be displayed to the user in the same or different window of browser 115. Alternatively, the image template may be displayed user after user input is collected and processed by the server system 120.

In one example, image templates may be implemented as one or more Flash objects. These objects are self-contained programs that are usually written in ActionScript™ programming language. Flash objects are usually stored on a server-side database and retrieved when a web page containing reference to the object is downloaded by the browser. In particular, Flash objects may be embedded into a web page by providing a reference in a HTML object or embed tag, or a CFML object tag. Once the flash object is downloaded, the Internet browser displays it using a Flash Player, which is distributed by Macromedia, Inc. and which can be downloaded from the Macromedia website "http://www.macromedia.com/".

Flash technology allow integration of video, text, audio, and graphics into one or more movie files. Flash treats these elements as collections of geometrical objects rather than as bit maps. Graphics can be integrated into a Flash movie in both bit map and vector formats. Advantageously, same vector-format is native format of Flash movies, vector-based graphics and animation appears substantially similar on different browsers and computer systems. (Vector graphics will be described in more detail below.) In addition, text fonts are also treated by Flash objects as images. Text fonts are defined by the outline of each character. Hence, they can easily scale without loss of resolution and clarity.

In another example, image templates may be implemented as Encapsulated Post Script (EPS) files. The EPS files may be written using PostScript, which is an object-oriented language developed by Adobe Systems Inc. for producing images. EPS files allow integration of static images, texts and graphics. Similar to Flash movies, EPS files support vector-image format, meaning they describe a page in terms of geometrical objects such as lines, arcs, and circles. In addition, fonts are also represented as objects defined by the outline of each character. Hence, all graphic elements of an EPS file can be easily scale without loss of resolution and clarity.

In yet another example, image template may be implemented as Scalable Vector Graphics (SVG) file, which is a vector graphics file format that enables two dimensional images to be displayed in XML pages on the Web. In general, the SVG format provides functionality similar to Flash movies. However, in contrast to Flash, SVG vector images are created through text-based commands formatted to comply with XML specifications. In SVG, a browser is defined as being a blank canvas that is defined by a multitude of x and y points. Each point in the canvas can then be utilized to create a shape via a mathematical formula Presently, SVG files may be displayed through the use of a browser plug-in such as the Adobe SVG plug-in, distributed by Adobe Systems Inc.

In another example, image templates may be implemented as a Java applet. Applets are usually written in Java programming language and embedded into a web page using a HTML applet tag or a CFML cfapplet tag. Various attributes of HTML tags may be used to specify location and alignment of the applet on the page. Values to various parameters used by the applet to display data may be passed using aparam tag, wherein each tag contains a name/value pair. The applet may access any parameter by name, by invoking the Java method getParametsr. Similarly to Flash objects, Java applets can display any combination of text, graphics and images. However, in contrast to Flash objects, which are run in a Flash Player, Java applets are executed directly by the internet browser 115.

In yet another example, image templates may be implemented as one or more of HTML, XML and CFML tables. The table may comprise plurality of rows and columns organized according to specific franchise requirements. The background of the table may be set to a predetermined color scheme. The fields of the table may be populated with video, text, audio, and graphic elements. The table may contain both the vector- and bitmap-formatted graphics. In another example, appearance of the elements in the table may be defined using Cascading Style Sheets (CSS), eXtensible Style Language (XSL) or the like. Finally, the table may be displayed in the same or new browser window as the underlying HTML form.

As shown is step 330, proprietary and non proprietary texts, graphics and animations may be encapsulated into the image templates during the custom image creation process. The proprietary graphics may include but are not limited to company logos, trademarks and affiliations. The graphics may further include various text fonts and distinctive color schemes and gradients that conform to specific franchise requirements. The nonproprietary graphics such as various images and photographs may also be encapsulated into the image templates. The placement and juxtaposition of all graphics elements may be specified during the image design process or during template design process. In addition, video, animation and audio files may be encapsulated into the custom image. Finally, any arbitrary text may also be display in the custom image.

In one example, the encapsulated graphics may be in vector format. Such formats can include but are not limited to Encapsulated Post Script (EPS), Scalable Vector Format (SVG), and Flash™ format. Such vector images are made up of many individual, scalable objects. These objects are defined by mathematical equations rather than pixels, as the bitmap images are, so they render at a high quality. Vector objects may consist of lines, curves, and shapes with editable attributes such as color, fill, and outline. Since changing the attributes of a vector object does not effect the object itself, object attributes may be freely changed without destroying the basic object. This enables vector-based images to be easily scaled to the desired proportions without loss of quality as often is useful for custom sign images that are frequently reproduced having different dimensions.

In another example, the encapsulated graphics may be in bitmap format. Bitmap images are represented in a computer memory as rows and columns of dots. Common bitmap images formats are GIF, JPEG and JPG. These images may be created any image editing program such as Microsoft Paint and Adobe Photoshop. Since bitmap images are resolution dependent, they do not scale as well as vector images and may loose quality and clarity if stretched or resized Various graphics may be embedded into the image templates in different ways depending on whether their static or dynamic characteristics. Static graphic elements may be grouped and locked in a particular configuration. The dynamic elements, i.e., animation, may be replaced with custom Flash movie clip objects that are coded to behave in accordance with the prescribed instructions. An example instruction may provide for an embedded text field to be populated with the contents of variable x, the content may then be left-justified, and resized to a 180×180 pixels area, for example. Notably, when vector-based static images are embedded into a Flash movie files, they are not converted into the bitmap format, and, therefore, maintain their vector characteristics.

The appearance of image templates may be controlled by numerous variables. Exemplary variables are single-line, double-line, phone number, list, and various hidden variables. If "single line" is chosen, for example, a single line field is displayed to the user. If "phone number" is selected, two fields are displayed, one for the area code, and another for the phone number. If "list" is chosen, a list is supplied by the web server 130, which displays to the user a dropdown list to choose from. Finally, "hidden" data may be used to select the sign style that user should not have control over such as the color scheme, fonts and the position of elements on the custom image. This variable list is not exhaustive, in fact many other variables may be used to define appearance and behavior of image templates, as well as custom data with which templates are populated.

One or more user input fields in the HTML form may be correlated to the variables in the embedded image template. For example, if an image template is implemented as a Flash object, some CFML elements can correlate to Flash variables listed in the object embed tag. To accomplish this, in one instance, a global object named signVars may be created by the Flash object. This object may be used to provide access to the custom data from all levels of the embedded Flash object. All the variables listed in the flashvars tagline of the HTML form may be converted to internal variables in a global sign-Vars namespace, whereby effectuating mapping between CFML user input fields and the custom data display fields in the Flash object.

During step 340, when the Web page is called for the first time, the forms engine 140 generates an HAL form and populates variables of the embedded Flash object with empty values unless the value is of type "hidden" in which case the hidden value is used. As another illustration, the Flash object may be populated with sample values, whereby a "demo" sign is displayed to the user. The sample data may be overwritten by user input data once it becomes available.

Then, once the user input data is entered into the HTML form and the web page is reloaded during step 350, the user input is sent via the flashVars tagline to the web server 130. This allows the user input data to be mapped into Flash variables in the global signVars namespace. The input data stored in a database and automatically sent back to the web page, during step 360, to update variable in the Flash object, at which point a new custom image updated with the user input data is displayed to the user. If no data is received by the embedded Flash object, it may display a "demo" sign populated with sample data, which will be overwritten once custom data becomes available. In one example, the entire Web page including the embedded Flash object may be reloaded. Alternatively, only the Flash object may be updated with user input data and reloaded by the Internet browser 115.

A sever system 120 can be configured in many ways. For example, before the Flash object executes, one or more custom code libraries may be loaded to a client system 110 for each Flash object embedded in the HTML form during step 370. These libraries contain functions created by the system administrator for use across different image templates, usually but not always within the same franchise. The functions may be written in an ActionScript programming language. In general, these functions are used by the embedded Flash object to format user input to conform to franchise requirements as shown in step 380.

As an example, one such library shared by different Flash objects may extend the string class and contain functions that, for example, format phone numbers, capitalize the first letters of each word in a line of text, applies different font faces to various text elements, or search a string to see if it contains certain characters. Another library may, for example, convert PMS colors into HTML RGB HEX values for on-screen display. Many other custom code libraries may be created by the system administrator to customize appearance of various images.

If several signs or proprietary images are embedded into a single image template, a determination which image to display first may be made at this point. Often, precedence is determined by the franchise or association, and the image template is coded to reflect that precedence. In one example, some franchises require exact placement of its logos and various association emblems on their affiliates' signs. Association emblems, in this instance, may be required to be placed the rightmost corner of the image and logos are to be placed to the left of the association emblems. In addition, registered trademark and copyright superscript emblem placement may be also determined by the franchise and accommodated in the image template.

Finally, during step 390, once the user input data is properly formatted and proprietary graphics are encapsulated into the image template, the custom image is displayed to the user. In particular, in one example, the Internet browser 115 runs a Macromedia Flash player in the browser window to display the Flash object as a Flash movie clip. The user can see the custom image on the computer displayed. At this point the user can accept the design as is, or make changes to the HTML form data, and refresh the page which resends the user input data to the web server 130 and back to the page and restarts the image generation process. If desired, the user may print the custom image or save it on client system 110. Once the order is completed, the custom image, such as advertisement sign, business or promotional product will be manufactured and sent to the customer.

Still with reference to FIG. 2, the server system 120 may include a plurality of databases for storing customer information, image templates, custom graphics and completed custom image designs. Though several distinct databases are shown in FIG. 2, this division is merely logical, and all databases may be implemented on one or more non-volatile storage mediums, such as magnetic or optical disks. These databases are preferably local to the server system 120 for quick retrieval of the data stored therein. The databases can be accessed both by the web server 130, graphics server 140 and at the back end by the system administrator. The databases can be implemented using any know database management system including but not limited to MYSQL, SQL Server, and Microsoft Access.

Various databases employed by the server system 120 will be described next with reference to FIG. 2.

The customer database 160 may be used to store customer identifying information, including customer names, addresses, c-mails, affiliations, and the billing information. The customer database may also be used to store customer login information such as a username and a password. A registered customer can be assigned a unique identifier that can be used to identify a customer in the customer database 160 and to map customer identifying information to customized sign proofs as well as other customized products ordered by the customer and stored in custom image database 170. The customer information in the customer database 160 may be used by the server system 120 when registering a new customer, authenticating a returning customer, processing billing information, and placing a new order or shipping a completed order to the customer.

The server system 130 could also include graphics database 190. The database may be used to store custom graphics such as logos, trademarks, affiliation, photographs and other custom graphics that may be used during an image generation process. In addition, database 190 may contain sample images of promotional products, such as pens, mugs, and hats. In addition to images, the database 190 may also store various proprietary font libraries that may be retrieved upon request from the web server 130 during image generation process. The graphics database 190 can be accessed by the web server 130 when populating an image templates with custom graphics. In addition, the database may be accessible to the system administrator through a backend panel. The administrator may add new custom graphics, update old images, or purge outdated designs.

The server system 130 may also comprise an image template database 180. The database can store image templates, which may be implemented as Flash objects, Java applets or EPS files. Each image template may be formatted to correspond to a particular sign image. The database 180 is typically accessed by the web server 130 during the image generation process to retrieve one or more image templates. In addition, the image template database 180 contains a plurality of the above-described custom code libraries. These libraries may be downloaded from the web server 130 by, for example, an embedded Flash object and stored in cache of client system 110 during the image generation process. It should be noted that even though not all sign templates will use all functions provided by the shared libraries, the libraries may be available to all image templates. In addition, to improve ease of maintenance and integration, it is desirable that both the image templates and the custom libraries are written in the same programming language.

In yet another example, the server system 130 may also include a custom image database 170. The database can store all image-related information for use in reproducing a custom image. The database 170 is typically accessed by the web server 130 during the customization process to store the user input while an image is being customized. In particular, web server 130 retrieves custom data stored in the database 170 to populate image template fields during image generation process. In addition, the database can be accessed to retrieve custom image data after the generation process has been completed and order has been placed. The database is also accessible to system administrators and to the product manufacturer who produce the customized graphics and other custom products based on the customization data stored in the database 170.

Furthermore, the server system 130 may include graphics engine 150. The graphics engine 150 could be part of the web server 130 as shown in FIG. 2; alternatively, a separate graphics server may host the graphics engine 150. The graphics engine is primarily used by the graphic designers to design custom graphics, including logos, trademarks and affiliations. The engine may execute any known vector-graphics generation software, including but not limited to Macromedia Freehand.RTM., Adobe Illustrator.RTM. and CorelDraw.RTM. In addition, the graphics engine 150 may be used to convert bitmap images, such as photographs and other graphics submitted by the customer, into a vector format; the process known as vectorizing. A bitmap image submitted by the customer to be embedded into a custom graphic design can be converted into Flash format; alternatively, the image may be converted into Encapsulated Post Script (EPS) or Scalable Vector Format (SVG). The above listed vector graphics generation software may be used to convert bitmap images into the vector format. Once created or vectorize, the vector-based images are preferably scaled to a default size, e.g., 180.times. 180 pixels, and stored in the graphics database 190.

Figure 4:
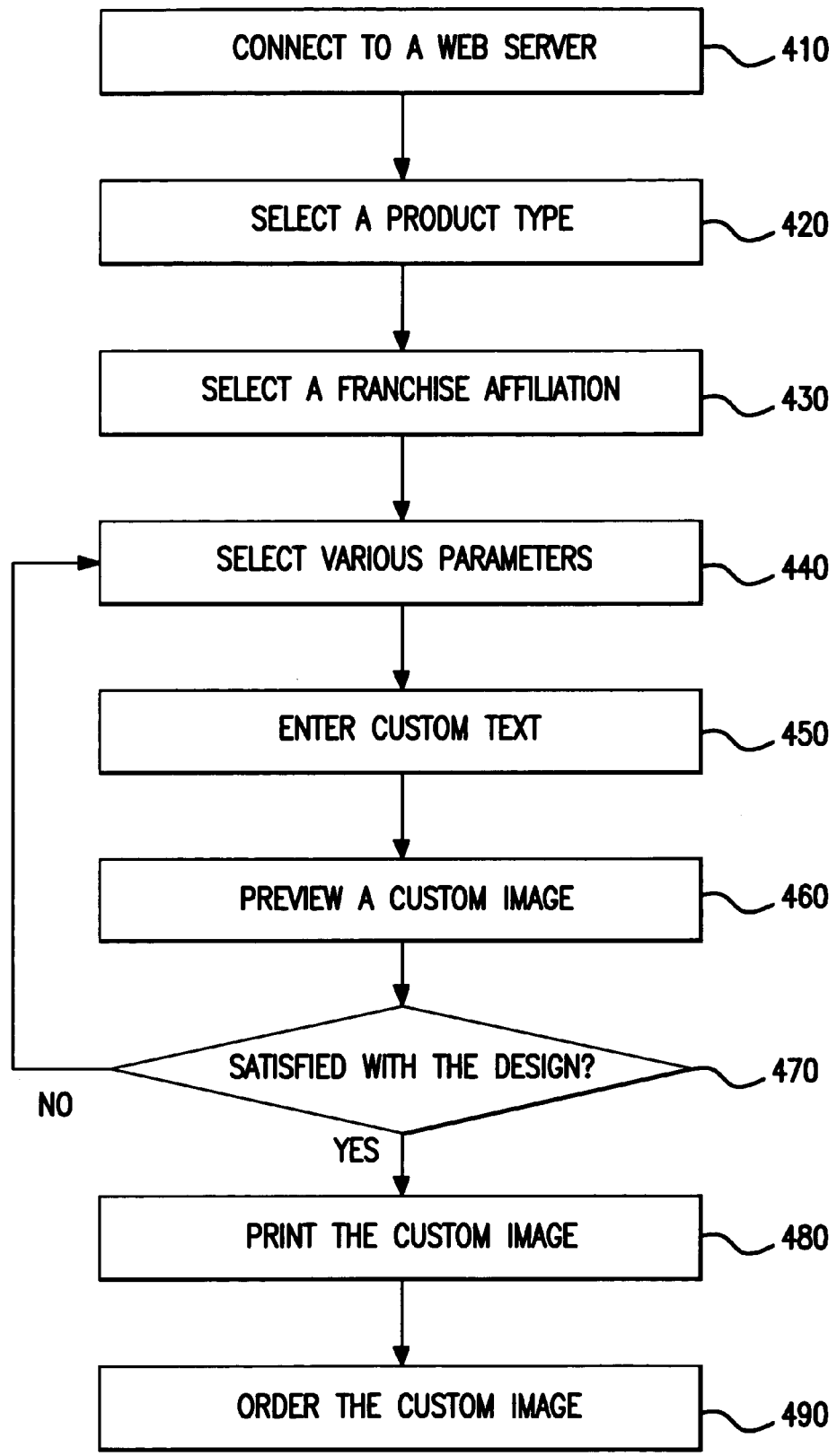
FIG. 4 is a flow diagram of another exemplary operational scenario involving a custom graphics generation system.

A method for ordering custom graphics using the above described server system 120 will be described next with reference to FIG. 4, as well as FIGS. 5-7, which show exemplary HTML forms that may be generated by the web server 130 to facilitate image generation process.

First, during step 410, a customer, e.g., a user of client system 110, directs its Internet browser 115 to the web server 130, thereby initiating an HTTP communication session with the server system 120. In response, during step 420 the web server 130 generates a webpage that displays a menu from which a user can select a type of product that user wants to customize. This menu includes but is not limited to such categories of products as real estate signs, swing posts, custom riders, commercial signs, brochure boxes, magnetic signs, lock boxes, etc. As another illustration, a user may be offered to choose a promotional product such as a pen, mug, hat, etc. that user can brand. As yet another illustration, a user may be offered to choose a business-related product such as business cards, name tags, forms, purchase orders and receipts.

In addition, the Web page may provide a login screen, so that a registered customer may access his account and view orders products and order new products using the previously submitted customer information.

Once a category of product is chosen, in step 430, the customer then is presented with a second web page displaying a menu from which the user can choose the type of franchise with which he is affiliated. Such franchises may comprise various real estate companies such as Re/Max®. If the user chooses a promotional product in step 420, then the list of trademark that can be branded onto the product is displayed to the user. The list may include such famous trademarks as a Coca Cola®.

A user who wishes to customize a product using a photograph or another custom graphics, may also be provided with an option to upload such custom graphic to the web server 130. Once uploaded, the photograph or custom graphics may be stored in a database. If the uploaded graphics is bitmap formatted, it may be vectorized by an appropriate graphics program run on the graphics engine 150. Alternatively, the image may be encapsulated into the image template in its original bitmap format. In addition, to improve processing of the uploaded graphics, a user may be asked to specify various image parameters such as image format, dimensions, color, etc. Moreover, the user may be allowed to crop and resize the image that as he wishes it to appear on the final custom product or graphics. This functionality could be facilitated by the graphics server 150.

In the next step 440, the customer is presented with an HTML form having embedded therein a Flash movie clip of a sample sign image. The image may be populated with sample values, which serve as a demonstration In addition, the form may have a plurality of fields, such as text, radio and check boxes, which enable the user to further customize his sign. An example of such an HTML form is shown in FIG. 5. The form may offer the user an option to chose a quantity of signs he wishes to order, frame color, sign material, and such optional features as vanish. The form may further provide a user with a "calculate" button which if clicked on, opens a new browser window showing tentative price of the order. In addition, a "design it" button may be provided, which when clicked on reloads the web page and displays to the user a new form, in which a sample sign image is customized with the user selected features and the further customization options are provide.

In the next step 450, the user is presented with an updated HTML form through which a user can further customize his sign image by entering custom text. As an illustration, the custom fields of the embedded Flash movie clip are no longer populated with sample values, but rather left empty as shown in FIG. 6. In addition, a form having a plurality of fields corresponding to the custom fields of the sign image is displayed to the user. Such fields may include but are not limited to a realtor emblem, agent name, optional numbers, company name and telephone number. Once a user inputs the data into one or more of fields and clicks on the "design it" button, the CFML code collects user input data and passes it to the web server 130. This data is mapped into a Flash object variable, saved in the custom image database 170, and sent back in order to update the Flash object embedded in the HTML form.

At step 460, the user is presented with an updated HTML form which shows a custom sign proof as, for example, a Flash movie clip with a text field populated with user input data formatted in accordance with franchise requirements. The formatting rules provided by the custom code libraries are downloaded from the web server 130 and applied to the user input data as described above. FIG. 7 shows an example of a custom sign proof generated through the above-described process. If the customer is not satisfied with the custom design, he may proceed in step 470 to reenter the custom data at step 450 into the HTML form or to redesign the sign at step 440 altogether if the customer is satisfied with the custom design, he may print the sign at step 480, and complete the transaction by placing the order during step 490. Finally, once the order is processed by the server system 120, the custom signs are manufactured based on the custom sign proofs and shipped to the customer.

As another example of the wide range of the systems and methods disclosed herein, a system and method can be configured to allow customer to type an arbitrary text to be embedded on the product. This feature can be useful such as in the sign making industry, in which names of the customers as well as their contact information can be reproduced on a custom sign. They can also be configured to enable customization of promotional products as well as generating customized advertisement sign, business cards or commercial graphics. The vector-formatted custom image can remain when the custom range is delivered and displayed to a customer. In this way, a customer can manipulate the custom image without losing quality and clarity. This can be useful in many situations, such as when dealing with franchise customers who have strict font face and size requirements for text appearing on products and graphics of their affiliates. Additional advantages exist for other systems and methods disclosed herein.

It is further noted that the systems and methods may be implemented on various types of computer architectures, such as for example on a single general purpose computer or workstation, or on a networked system, or in a client-server configuration, or in an application service provider configuration. In multiple computer systems, data signals may be conveyed via networks (e.g., local area network, wide area network, internet, etc.), fiber optic medium, carrier waves, wireless networks, etc. for communication among multiple computers or computing devices.

The systems' and methods' data (e.g., associations, mappings, etc.) may be stored and implemented in one or more different types of computer-implemented ways, such as different types of storage devices and programming constructs (e.g., data stores, RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, etc.) that contain instructions for use in execution by a processor to perform the methods' operations and implement the systems described herein The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

What is claimed is:

1. A method for a custom image design comprising:
   collecting a user input using one or more electronic forms;
   retrieving from a database one or more image templates having one or more variables associated therewith;
   mapping at least a portion of the user input into the one or more template variables;
   generating a custom image based on the image template and at least a portion of the user input,
   wherein the custom image is at least in part vector based; and
   electronically sending to the user the custom image.

2. The method of claim 1 further comprising a step of embedding the image template into an electronic form.

3. The method of claim 1 further comprising a step of storing the user input in the database.

4. The method of claim 1 further comprising a step of formatting at least a portion of the user input to generate the custom image.

5. The method of claim 4, wherein the user input is formatted in accordance with custom formatting rules provided by one or more custom code libraries.

6. The method of claim 1, wherein the image template is one or more of a Flash object, Encapsulated Post Script file, Scalable Vector Graphics file, Java applet, HTML table, XML table and CFML table.

7. The method of claim 1, wherein the custom image is one or more of a Flash object, Encapsulated Post Script file, Scalable Vector Graphics file, Java applet, HTML table, XML table and CFML table.

8. The method of claim 1, wherein an electronic form comprises one or more of HTML code, CFML code, XML code, Common Gateway Interface script, Active Server Page script, JavaScript, and Flash object.

9. The method of claim 1, wherein the custom image comprises at least a graphics portion and a text portion,
   wherein the graphics portion comprises custom graphics and the text portion comprises at least a portion of the user input.

10. The method of claim 9, wherein the graphics portion is in one of bitmap format and vector format.

11. The method of claim 1, wherein the custom image is one of a sign, advertisement, promotional product, and business product.

12. A system for custom image design, comprising:
    at least one database storing one or more image templates having one or more variables associated therewith;
    a form processing software code suitable
       (i) to retrieve an image template from a database,
       (ii) to generate an electronic form having a plurality of fields, wherein the fields at least in part correlate to one or more template variables, and
       (iii) to collect a user input using the generated electronic form;
    an image processing software code suitable to generate a custom image based on the retrieved image template and at least a part of the collected user input,
    wherein the custom image is at least in part vector based; and
    an image delivery software code suitable to deliver the custom image to the user.

13. The system of claim 12, wherein the image template is embedded into an electronic form.

14. The system of claim 12 further comprising a database for storing the user input.

15. The system of claim 12 further comprising one or more custom code libraries suitable to format the user input to generate the custom image.

16. The system of claim 12, wherein the image template is one or more of a Flash object, Encapsulated Post Script file, Scalable Vector Graphics file, Java applet, HTML table, XML table and CFML table.

17. The system of claim 12, wherein the custom image is one or more of a Flash object, Encapsulated Post Script file, Scalable Vector Graphics file, Java applet, HTML table, XML table and CFML table.

18. The system of claim 12, wherein an electronic form comprises one or more of HTML code, CFML code, XML code, Common Gateway Interface script, Active Server Page script, JavaScript, and Flash object.

19. The system of claim 12, wherein the custom image comprises at least a graphics portion and a text portion, wherein the graphics portion comprises custom graphics and the text portion comprises at least a portion of the user input.

20. The system of claim 19, wherein the graphics portion is in one of bitmap format and vector format.

21. The system of claim 12, wherein the custom image is one of a sign, advertisement, promotional product, and business product.

22. A method for customizing an image comprising:
receiving from a server a first electronic form having embedded therein one or more image templates, wherein the electronic form comprises a plurality of fields that at least in part correlate to one or more variables associated with the embedded image template;
providing to the server using the one or more received electronic forms a first set of image customization data; and
receiving a first custom image based on an image template and the provided first set of image customization data, wherein the custom image is at least in part vector based.

23. The method of claim 22, wherein the first custom image is embedded in a second electronic form.

24. The method of claim 23 further comprising a step of providing to the server a second set of image customization data using the second electronic form to generate a second custom image.

25. The method of claim 22, wherein an image customization data at least in part mapped into one or more variables associated with the embedded image template.

26. The method of claim 22, wherein the image template is one or more of a Flash object, Encapsulated Post Script file, Scalable Vector Graphics file, Java applet, HTML table, XML table and CFML table.

27. The method of claim 22, wherein the custom image is one or more of a Flash object, Encapsulated Post Script file, Scalable Vector Graphics file, Java applet, HTML table, XML table and CFML table.

28. The method of claim 22, wherein an electronic form comprises one or more of HTML code, CFML code, XML code, Common Gateway Interface script, Active Server Page script, JavaScript, and Flash object.

29. The method of claim 22, wherein the custom image is one or more of a Flash object, Encapsulated Post Script file, Scalable Vector Graphics file, Java applet, HTML table, XML table and CFML table.

30. The method of claim 22, wherein an electronic form comprises one or more of HTML code, CFML code, XML code, Common Gateway Interface script, Active Server Page script, JavaScript, and Flash object.

31. The method of claim 22, wherein the custom image comprises at least a graphics portion and a text portion, wherein the graphics portion comprises custom graphics and the text portion comprises at least a portion of the user input.

32. A computer-readable storage medium encoded with instructions that cause a computer to perform a method for a custom image design, said method comprising:
collecting a user input using one or more electronic forms;
retrieving from a database one or more image templates having one or more variables associated therewith;
mapping at least a portion of the user input into the one or more template variables;
generating a custom image based on the image template and at least a portion of the user input, wherein the custom image is at least in part vector based; and
electronically sending to the user the custom image.

33. The computer-readable medium of claim 32, wherein said method further comprises a step of embedding the image template into an electronic form.

34. The computer-readable medium of claim 32, wherein said method further comprises a step of storing the user input in the database.

35. The computer-readable medium of claim 32, wherein said method further comprises a step of formatting at least a portion of the user input to generate the custom image.

36. The computer-readable medium of claim 35, wherein the user input is formatted in accordance with custom formatting rules provided by one or more custom code libraries.

37. The computer-readable medium of claim 32, wherein the image template is one or more of a Flash object, Encapsulated Post Script file, Scalable Vector Graphics file, Java applet, HTML table, XML table and CFML table.

38. The computer-readable medium of claim 32, wherein the custom image is one or more of a Flash object, Encapsulated Post Script file, Scalable Vector Graphics file, Java applet, HTML table, XML table and CFML table.

39. The computer-readable medium of claim 32, wherein an electronic form comprises one or more of HTML code, CFML code, XML code, Common Gateway Interface script, Active Server Page script, JavaScript, and Flash object.

40. The computer-readable medium of claim 32, wherein the custom image comprises at least a graphics portion and a text portion, wherein the graphics portion comprises custom graphics and the text portion comprises at least a portion of the user input.

41. The computer-readable medium of claim 40, wherein the graphics portion is in one of bitmap format and vector format.

42. The computer-readable medium of claim 32, wherein the custom image is one of a sign, advertisement, promotional product, and business product.

* * * * *